Figure 1:
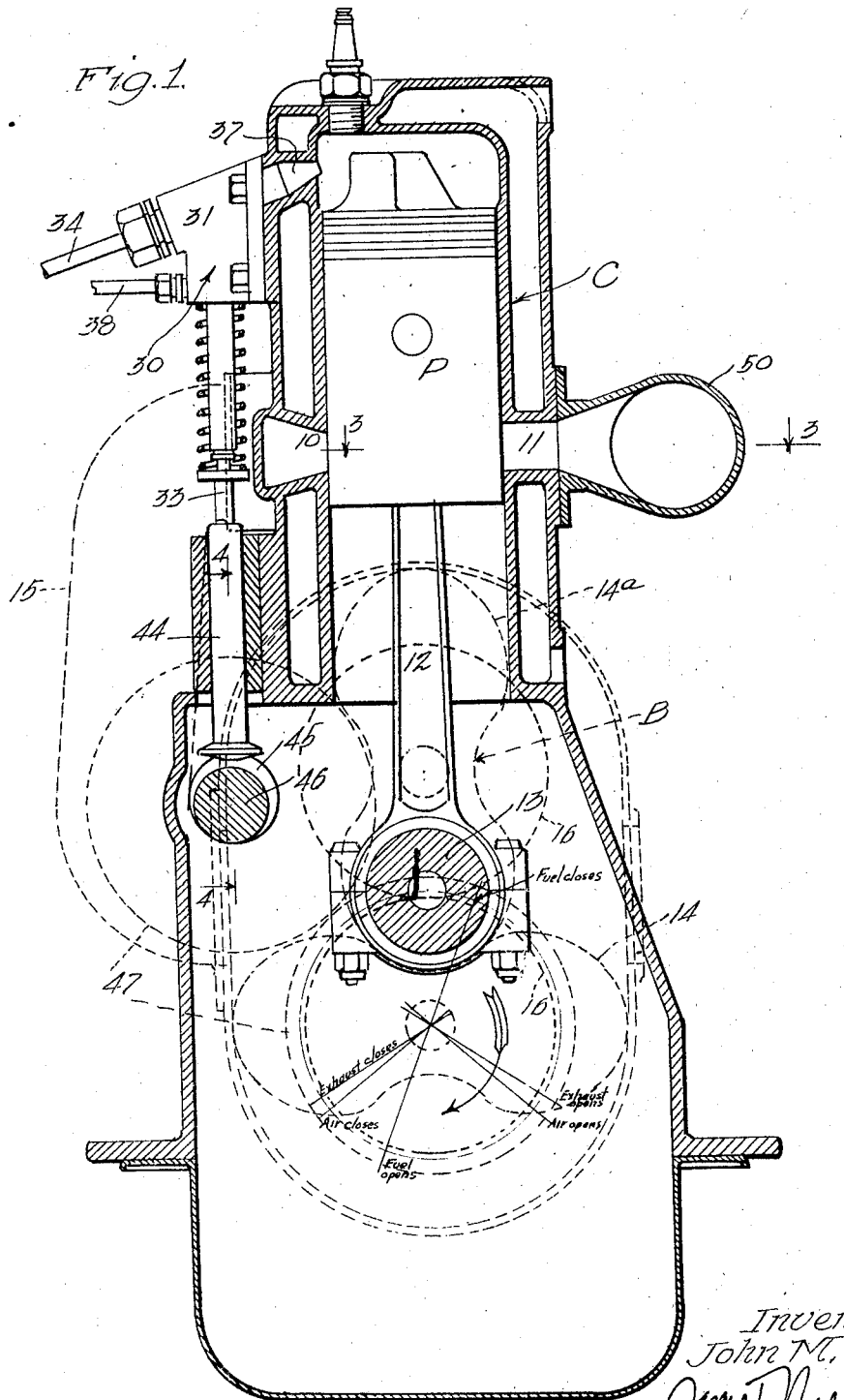

March 2, 1926.  
J. M. CAGE  
INTERNAL COMBUSTION ENGINE  
Filed August 25, 1921  
6 Sheets-Sheet 2  
1,575,541
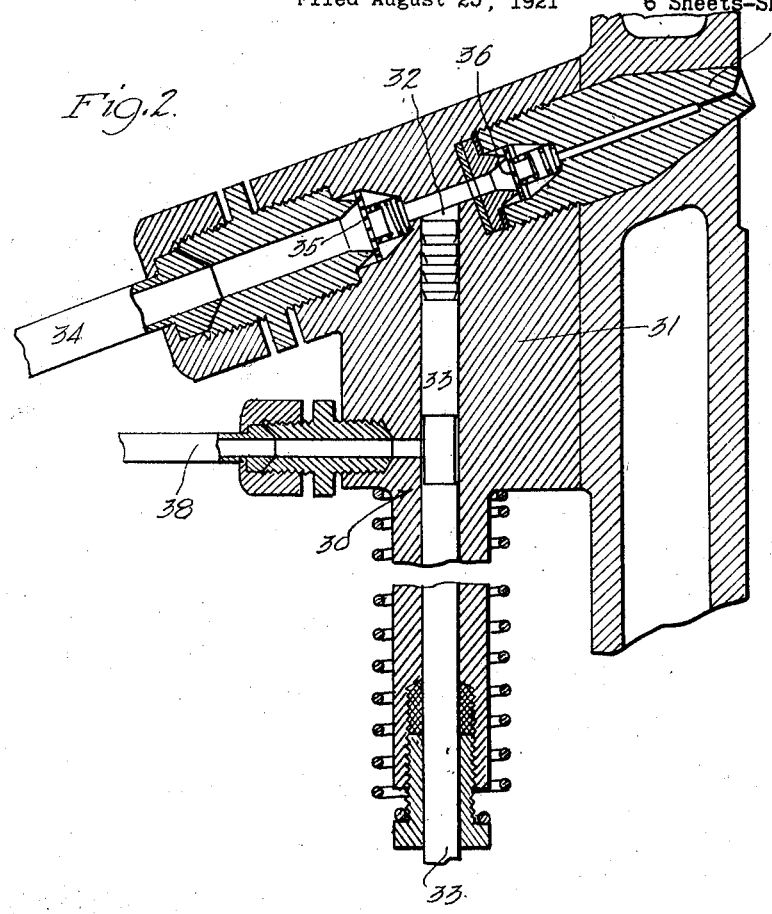
Fig. 2.
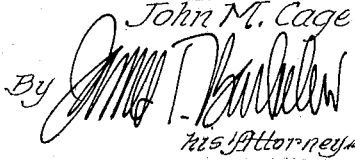

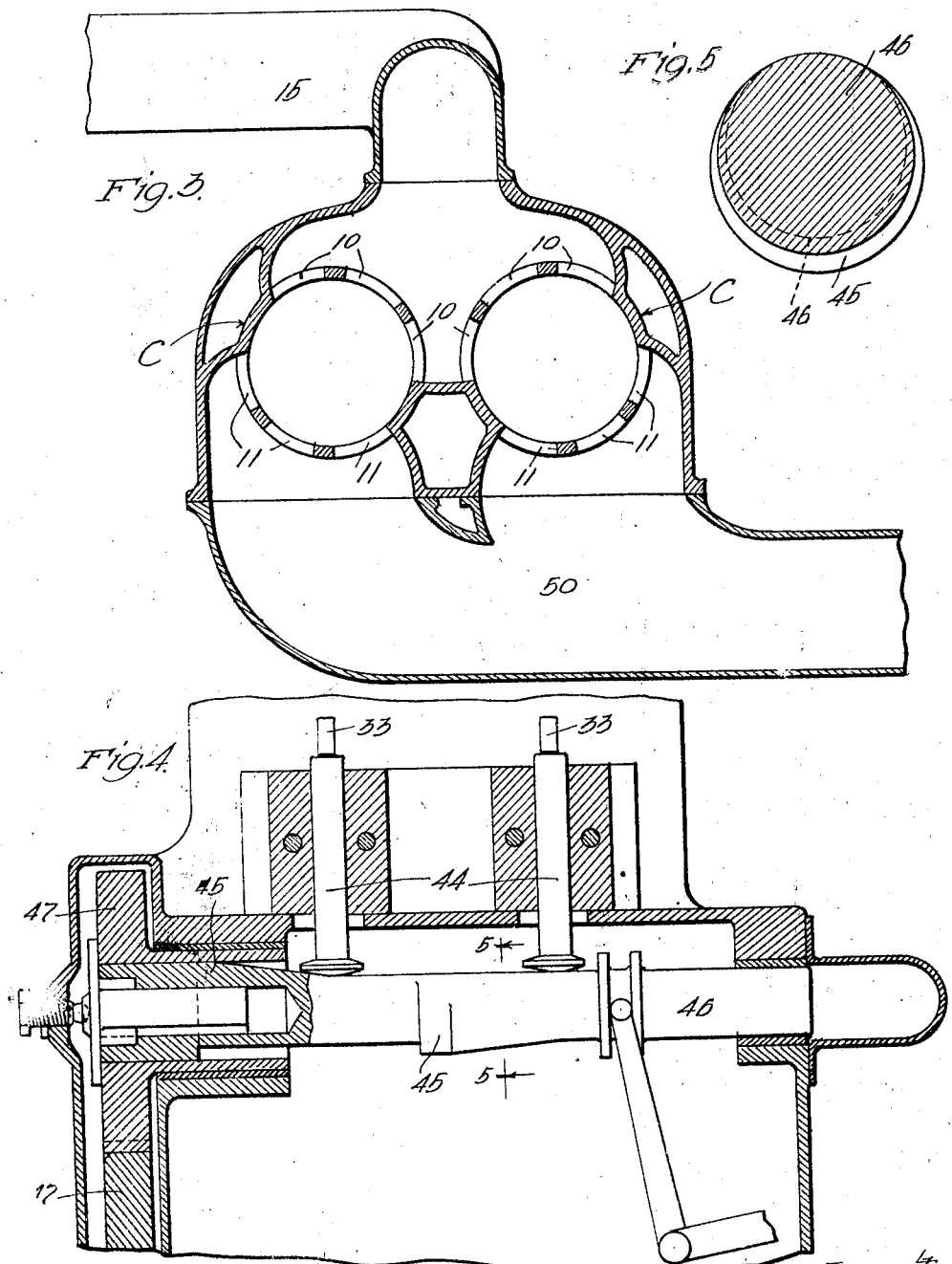

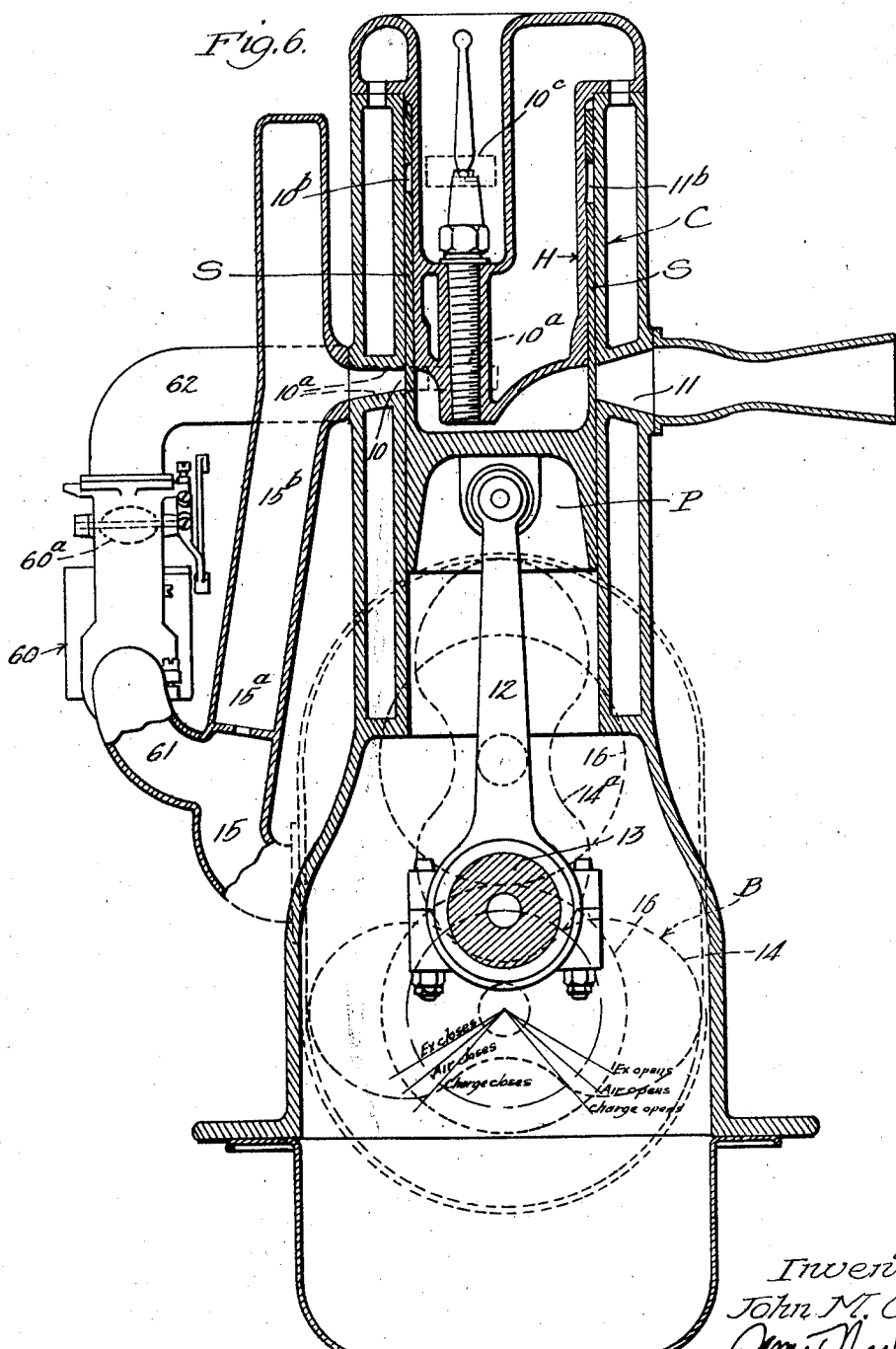

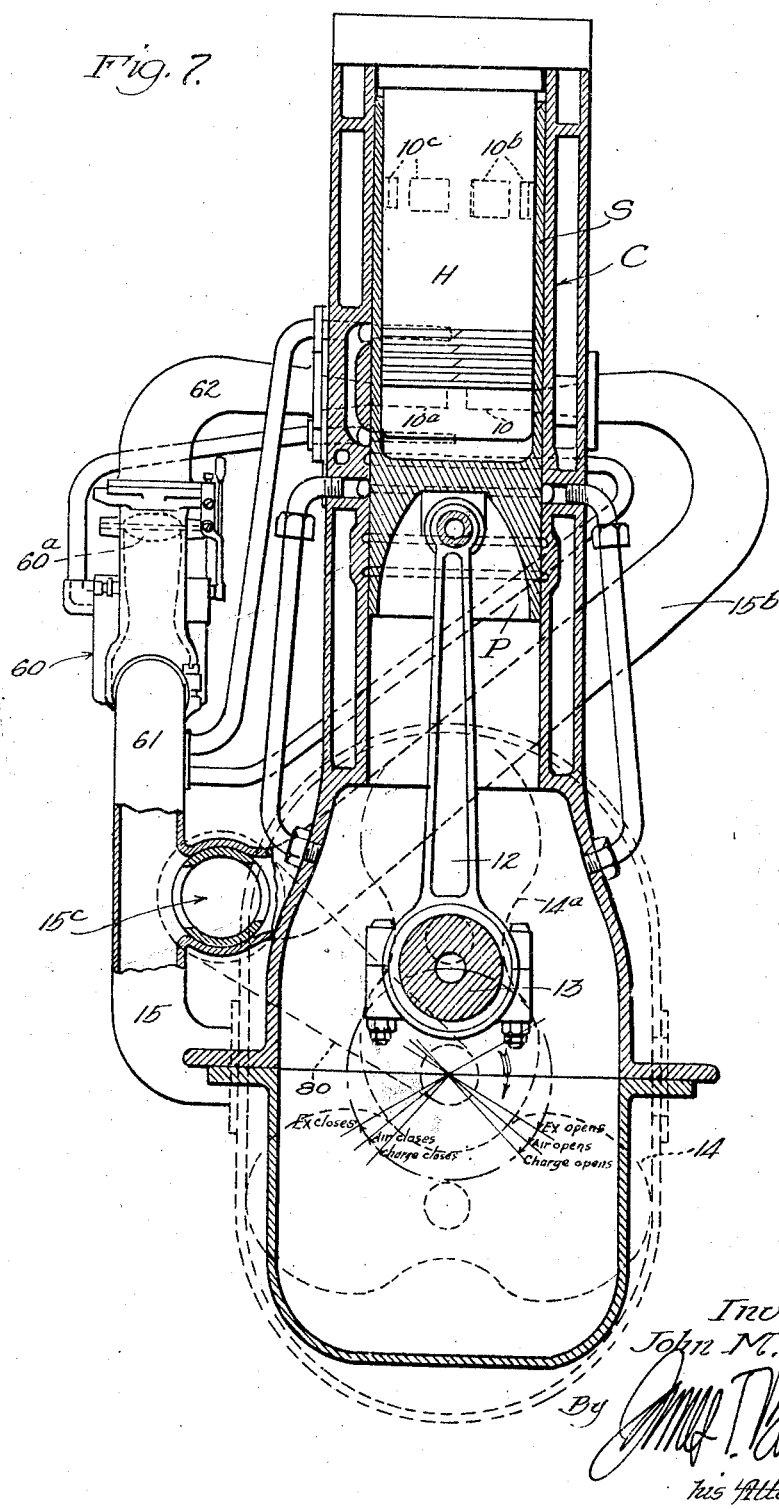

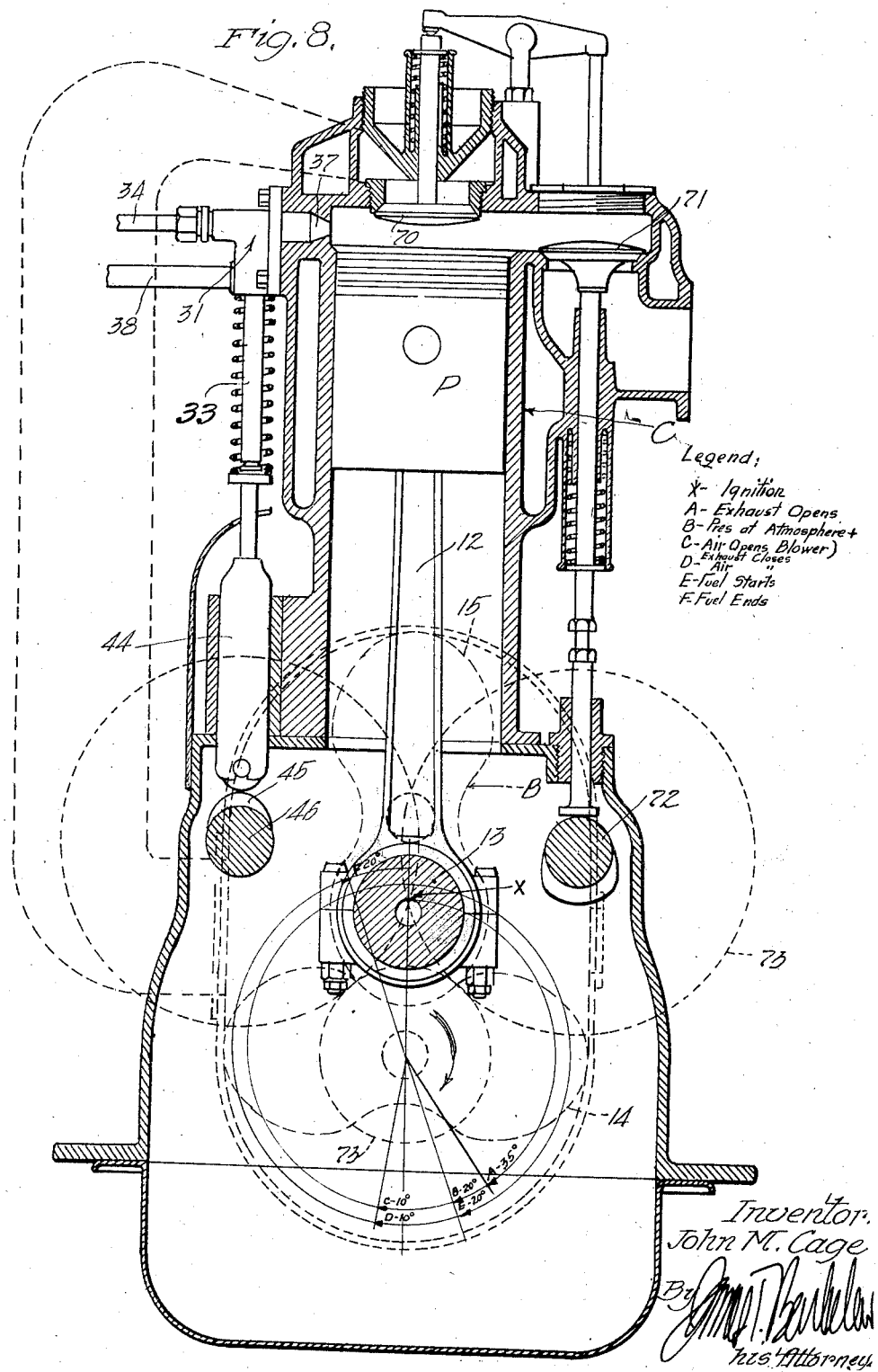

Patented Mar. 2, 1926.

1,575,541

UNITED STATES PATENT OFFICE.

JOHN M. CAGE, OF SANTA MONICA, CALIFORNIA, ASSIGNOR, BY MESNE ASSIGNMENTS, TO HALVOR ANDRESEN, OF CHRISTIANIA, NORWAY, AND OLIVER OTIS HOWARD, OF ROCKPORT, MASSACHUSETTS.

INTERNAL-COMBUSTION ENGINE.

Application filed August 25, 1921. Serial No. 495,167.

*To all whom it may concern:*

Be it known that I, JOHN M. CAGE, a citizen of the United States, residing at Santa Monica, in the county of Los Angeles, State of California, have invented new and useful Improvements in Internal-Combustion Engines, of which the following is a specification.

This invention relates generally to internal combustion engines; and although the major and most particular parts of the following specification will be seen to deal with two-cycle engines, it will be seen that, in its broader aspects, my invention is not necessarily limited to two cycle engines but may also be applied to four cycle engines.

This application has certain features in common with my previously filed application, Ser. No. 398,329, filed July 23d, 1920, for internal combustion engines and supplying charge thereto, and also in common with another application filed on or about even date herewith and entitled Internal combustion engines, Serial No. 495,166. In said prior application I have set out generally an engine construction and operation in which the charge, whether of air or of a combustible mixture, is fed into the combustion chamber under a pressure that varies in accordance with the resistance to flow of that charge at varying engine speeds; with the result that the charging of the combustion chamber is equable and uniform regardless of variations in speed of engine operations. Generally and broadly speaking, the matters set forth in said application are not limited either to such a charge (say of scavenging air) flowing merely into the cylinder and filling it or having the characteristics of flowing through the cylinder, or the characteristics of flowing through the cylinder in excess quantity. As distinguished from said prior application this present application has particularly to do with the flowing of the charge under what I may term "equable" pressure, through the cylinder; and, more specifically, flowing through the cylinder in excess quantity; so that a part of that charge (say a part of the initial charge of scavenging air) passes into and through the cylinder and out of the exhaust port.

In my said application filed at about even date herewith, I have explained in more particular the combination of such "equable" charging with a system for the positive introduction of the fuel; but here again without particular specific limitation as to the manner in which the combustion chamber is "equably" charged. In this present application the claims are directed most particularly to the mechanism and system of putting the charge through the cylinder, and, more specifically, to putting an excess of charge of air through the cylinder, so that such air flows through and out of the cylinder while the exhaust is open. Accordingly, in this application I explain only typical instances of the application of the idea of flowing charge through the cylinder, to indicate the broad field to which this idea may be applied.

There are many objects and corresponding accomplishments of the invention; and all of these will be best understood from the following detailed description of specific applications of the invention, reference for this purpose being had to the accompanying drawings, in which:—

Fig. 1 is a vertical cross section of a simple form of two-cycle injection engine to illustrate the application of my invention thereto; Fig. 2 is an enlarged detail section showing the fuel injection apparatus of such an engine; Fig. 3 is a horizontal section taken as indicated on line 3—3 of Fig. 1; Fig. 4 is a detail section taken as indicated on line 4—4 of Fig. 1; Fig. 5 is an enlarged detail section taken as indicated on line 5—5 of Fig. 4; Fig. 6 is another vertical cross section showing the application of my invention to an engine of the carbureter type; Fig. 7 is a similar view showing another type of carbureter engine; and Fig. 8 is a similar view showing the application of my invention to a four-cycle engine.

It will of course be understood that in these drawings I am showing applications of my invention to mechanisms that are the simplest typification of the various forms of engines. For instance, in some of the drawings I have preferred, for mere purposes of simplicity, to show my invention as applied to a two-cycle engine in which the ports are uncovered directly by the pistons. It will be understood however, that other systems of valve action may be used, as for instance, the sleeve valve arrangement.

Referring now first more particularly to Figs. 1 to 5, it will be seen that I have therein illustrated the application of my invention to a simple form of two cycle engine, and have chosen, in this particular instance, to show the fuel introduced in liquid form by injection means. I have illustrated an engine having a water-cooled cylinder C with a piston P therein which uncovers the intake port 10 and the exhaust port 11. The piston P is connected by connecting rod 12 to crank 13 of the engine shaft; and a blower B is driven from this engine shaft. In this particular case the blower B is shown as driven directly from the shaft; and the blower is shown as a blower of the "lobe" type, embodying two impellers 14 and 14ª, the first of which may be driven directly from the engine shaft and the second driven by gear arrangement from the shaft as indicated at 16. It is the function of this blower to raise a pressure on the air charge which varies in accordance with the resistance to the flow of air into or through the combustion space. This resistance to such a flow of air varies substantially as the square of the speed of engine operation; and such a blower as here illustrated, when operated at comparatively high speed, raises a pressure substantially following such proportion. A blower of this type operated at low speed is an impulse mechanism, raising a series of pressure impulses. However, at higher speeds, and due to the merging of such impulses in the air passage or manifold which is indicated at 15, and due also to the leakage factor of the blower, the pressures raised by the blower more or less accurately follow the proportions here stated: and they can further be made so varying the leakage factor or by providing by-passes for the blower. Furthermore, as explained in my former application, by providing proper compensating chambers I can make an impulse type of compressor do the work here required. Furthermore, the blower may be arranged in such relative position in relation to position of the piston and with relation to the times of opening and closing of the ports that its periods of higher pressure, on the succeeding impulses, and its periods of lower pressure, suit the particular requirements of resistance and flow of the charge. These matters however, are being now more completely developed in detail and I shall not go into such matters of detail in this application; as it is sufficient for my present purposes to explain that I use a pressure raising mechanism for the charge that will at all times raise a pressure that is substantially in proportion to the resistance to flow. In my prior application I have illustrated and described means for compensating the variable pressure of an impulse type of compressor and I have also illustrated the use of a centrifugal type of blower which, by its inherent nature, raises a pressure varying substantially in accordance with the square of speed of operation. Broadly speaking, any of these types of compressors, in any of these devices, may be utilized in my invention.

For the purposes of the present invention, the pressure raising mechanism raises upon the air charge a pressure as herein stated, and delivers a quantity of air that is preferably either sufficient to fill entirely the combustion chamber at each flow of the charge, or sufficient to more than fill it and flow an excess of air through the combustion chamber and through the exhaust port. The timing of the events in such an engine may be somewhat as illustrated in the diagram of Fig. 1. Of course it will be readily understood that this diagram to a certain extent is limited, in the possibilities of arrangements and adjustments of sequences, by the fact that in this simple type of two-cycle engine, the ports are uncovered directly by the piston. However, this scheme serves to explain my invention. It will be noted from the diagram that the exhaust opens first at a short distance before the piston reaches its lowermost position; and that then the air opens; that is, the piston uncovers the port 10 through which the air charge enters the cylinder. The air charge is thus entering the cylinder during the same time that the exhaust is escaping through exhaust port 11; and the air continues to flow into the cylinder until the air port is closed by the upward motion of the piston. The exhaust then subsequently closes. The feature that I here wish to bring out is the fact that, during the period that the air port 10 is open, flow conditions are maintained in the combustion chamber, the exhaust port being open during that time. These flow conditions are maintained, regardless of whether the exhaust is completely expelled,—whether the air charge is sufficient to entirely fill the cylinder,—or whether the air charge is more than enough to fill the chamber, and flows an excess out through the exhaust port. In either case it will be seen that, after the initial release of the exhaust pressure, the flow of air into and through and the flow of exhaust out of the cylinder is maintained entirely or principally by the pressure behind the air charge. In other words, the conditions during the introduction of the air charge are conditions of flow rather than conditions of packing the air charge or compressing the air charge into the cylinder. In some instances, particularly in two-cycle engines, and particularly in all engines at high speed or high power operation, it may be desirable to blow an excess quantity of air through the combustion chamber so that the inner wall surfaces of the chamber are thus cooled more effectively than they can be by the water jacketing alone. Consequently, and as more specifically claimed herein, I may prefer to pass an excess quantity of the air charge through the combustion chamber. On the other hand, at a low speed or at low power operation, it may be desirable to retain a part of the exhaust gases in the combustion chamber, for the purpose of retaining heat. If so desired the output of the blower at low speed may be made to accomplish this result. For instance, the leakage factor in the blower may be made larger; so that, as a result, the pressure output of the blower will have a variation greater than the square of operating speed.

The capacity of the passage or manifold 15 may be large enough to smooth off or average, the impulses of the blower; at the same time not so large that the change of pressure of the blower operation at a change of speed, will not be immediately effective at the inlet port 10.

Now in Figs. 1, 2, 3, 4, and 5 I show the application of these ideas to a two-cycle engine in which the fuel may be injected in liquid form. I have shown a simple mechanism for accomplishing this purpose, embodying a fuel pump 30 comprising a body 31 having a bore 32 in which pump plunger 33 may reciprocate. Fuel enters the pump through an inlet pipe 34 past an inwardly opening check valve 35 and is pressed out past an outwardly opening check valve 36 to the nozzle 37 which discharges into the combustion chamber. Pipe 38 introduces heavy lubricant under a high enough pressure to prevent by its pressure any leakage of fuel around the plunger; the plunger fitting the bore snugly enough that there is very little leakage of this heavy oil into the fuel in the pump. The pump plunger 33 may be operated by tappets 44 which follow cams 45 on a longitudinally slidable cam shaft 46 driven by gears 47 from the engine shaft in a one-to-one ratio. Cams 45 are of the form shown in detail in Fig. 5; and when their largest parts are under the tappets 44 then the pumps are operating at their fullest capacity. At the position shown in Fig. 4 the pumps are either not operative at all or are operating only enough to inject into the cylinder a very slight amount of fuel. Preferably, this injection of fuel may take place throughout a period of 180° as indicated by the diagram in Fig. 1; and it will be seen from the drawings, particularly from Fig. 5, that the shape of the cams is such that, regardless of the position of shaft 46 and regardless of the amount of movement imparted to the pump plungers, the pumping movement always requires an angular shaft movement of 180°. This however, may be arranged as is desired. I have also indicated that the beginning of fuel injection is ahead of the closure of the air port and of the closure of the exhaust port. In other words, the beginning of fuel injection may take place somewhat before the time that the air charge ceases to flow into or through the cylinder; and then the injection may go on during the subsequent compression stroke, and may even go on for a little time after the initial ignition of the combustible mixture.

I have also illustrated in Fig. 3 the arrangement and relation of the cylinders C in a pair. The intake ports 10 may face somewhat inwardly toward each other and toward the delivery of manifold 15; while the exhaust ports, arranged oppositely on each cylinder, discharge into passages that lead to the exhaust manifold 50. It will be seen that both the intake and exhaust ports may extend around a considerable part of the circumference of the cylinder.

In Fig. 6 I have illustrated the application of the foregoing described features of my invention to a simple form of two cycle engine in which the fuel is introduced in carbureted form. The engine herein shown is substantially the same as that shown in Fig. 1; excepting that piston P has a valve sleeve S sliding between a depending head H and the cylinder wall, and the sleeve has intake and exhaust ports $10^b$, $10^c$ and $11^b$. However, instead of a fuel injecting mechanism, I here show a carbureter 60 that may be fed with air through a branch 61 from the air manifold 15. This carbureter 60 delivers a mixture through manifold 62, controlled by throttle $60^a$, to the mixture intake port $10^a$ which may be arranged to be opened by sleeve port $10^c$ after the air port 10 is opened by sleeve port $10^b$, and closed before the air port 10 is closed by the sleeve port. The passage through manifold 15 may be restricted as indicated at $15^a$; so that a chamber $15^b$ may be at all times, or during the impulses of the blower, receiving air to store a certain quantity of air under a pressure conforming to the speed of operation of the engine as hereinbefore explained. The amount of air stored in the manifold $15^b$ may be of sufficient quantity so that when the air port opens, the maximum flow of scavenging air immediately takes place, flowing air into the cylinder, flowing the exhaust out, and preferably, flowing a part of that air through the cylinder and out the exhaust. Then, due to the restricted quantity of this air and restricted opening at $15^a$, the flow of this air may virtually cease, or at least greatly decrease; and the flow of mixture which begins after the initial flow of scavenging air, will maintain the flow of air into and through the cylinder; so that then while the mixture flows into the cylinder, under the same kind of pressure as hereinbefore described—a pressure varying in accordance with the resistance of flow— the previously introduced air is then flowed out through the exhaust port, at least in part, and the cylinder is filled with the mixture. This mixture may be a comparatively rich one and be designed to be mixed with a part of the scavenging air which may be allowed to remain in the cylinder; or it may be, comparatively speaking, a normal mixture, designed not to be mixed with any excess air; in which case all the scavenging air will be flowed out the exhaust. In any case, as will be readily seen, this arrangement provides for the maintenance of flow conditions during the introduction of the charge to the cylinder, under pressures which are commensurate with the resistance to such flow at varying speeds of operation.

In Fig. 7 I illustrate the application of these ideas to another type of two cycle engine using a carbureter: this type being similar to that shown and described in connection with Fig. 6. In Fig. 7, however, the arrangement of the ports is slightly different, the scavenging air and charge intake ports being shown at 10 and $10^a$, and the corresponding sleeve ports being shown at $10^b$ and $10^c$. The system of raising air pressure for the carbureter 60 is substantially the same as hereinbefore described, and a part of this air passes through branch 61 to the carbureter 60, while a part passes through branch $15^b$ to the scavenging air port 10. The capacity and shape of branch $15^b$ may be designed in accordance with the considerations hereinbefore set out; its capacity being sufficient to hold the quantity of air sufficient to pass into and through the cylinder, the escape of excess air through the cylinder occurring either before or after the charge intake port $10^a$ is opened. However, in this particular design I have illustrated, instead of the mere restricted opening $15^a$, as shown in Fig. 6 a valve $15^c$. This valve may be of any suitable type, say of the rotary type, and it may be either adjustably set to form a restricted opening equivalent to the open $15^a$, or it may be, as indicated in the drawings, connected up by driving mechanism indicated at 80, so as to be rotated at half engine speed and thus open and close the communication between pipe 15 and pipe $15^b$ once for every rotation of the engine. This valve may preferably be set in such timed relation to the other parts that it will be at substantially full opening in the position of the parts as illustrated, and will close approximately at, or slightly after the piston reaches bottom dead center. The function and effect of this valve is consequently to close the flow of scavenging air sooner than it would otherwise be closed, and still allow the scavenging air port 10 to be opened by the sleeve port $10^b$ at a time earlier than the opening of the charge port $10^a$ by sleeve port $10^c$. As will be easily noted, if the sleeve closed as well as opened the scavenging air port, then that port must necessarily close as far after bottom dead center as it opens ahead of bottom dead center. The valve at $15^c$ closes the scavenging air port earlier, and thus effects in general the same early cessation of scavenging air flow that the properly designed and limited capacity of pipe $15^b$ would effect. Consequently, it is not necessary, where the valve $15^c$ is used, that the pipe $15^b$ should be of any specific capacity.

In Fig. 8 I show the application of these ideas to a four cycle engine. Here the inlet valve 70 and the exhaust 71 are actuated in a well known manner from the cam shaft 72 that is operated by two-to-one gears 73 from the main shaft of the engine. The injection pump operating shaft 46, cam 45, tappet 44, pump plunger 33; and, in general, the whole pump mechanism 31, may be similar to that hereinbefore described. In the cycle of operation, ignition may be roughly assumed as taking place at the uppermost position of the piston and the power stroke then goes on to the point labelled A in the diagram of Fig. 8, and referred to in the legend attached to that figure; when the exhaust opens. The exhaust remains open until the point D is reached. The air opens at the point C in the diagram; this being the point where the intake valve 70 opens to allow the pressure air to enter the cylinder. The pressure air is under the variable pressure hereinbefore described. It flows into the cylinder and through it during the time that the exhaust is open; the amount of air introduced preferably being in excess of that required to merely fill the cylinder; so that the cylinder is cleared out perfectly clean of the exhaust gases. In general, either in a two-cycle or four-cycle engine, one of the advantages of putting through an excess quantity of air is that there is no liability of burned gases remaining in the cylinder in a mixture with the introduced air: the cylinder is blown out clean. Inflow of air, which has thus gone on during the upstroke of the piston, then continues during the downstroke of the piston until the point on the diagram indicated D is reached. The exhaust valve may also remain open during this period: although not necessarily so. If it does remain open during this period, then we may have a situation not only in which air is flowing into the cylinder to fill the space displaced by the piston, but also flowing through cylinder at the same time to flow a further excess through the exhaust port. Or the exhaust valve may be closed say on or about the uppermost position of the piston; in which case the remaining flow of air into the cylinder merely takes care of the increasing volume of the combustion chamber as the piston descends. In any case, flow conditions will be seen to be maintained; so that, under those flow conditions under pressures in accordance with the varying resistance to flow at varying speeds of operation, the cylinder will always receive a certain pre-determined and fixed charge of air. The amount of fuel charge introduced may of course be varied to suit the desired power output. In this particular design I have indicated that the injection of fuel starts at the point denoted E in the diagram and ends at the point denoted F in the diagram; that is, generally speaking, during the compression stroke. Thus it will be seen that I apply my invention, or the particular features of it which are herein set out, to a four-cycle engine as well as to a two-cycle engine; maintaining in the four-cycle engine the same flow conditions that I maintain in the two-cycle engine; and gaining therefrom the equable charging of the four-cycle engine regardless of its speed of operation and also gaining therefrom a perfectly clean cylinder; and, in the case where excess of air is flowed through the cylinder, also certain additional cooling effects. The general features of the application of this invention to a four-cycle engine will come within the scope of the broader claims in this present application; but the specific features of application of this invention to a four-cycle engine, including the specific cycle of operation, etc., I reserve for a specific application.

Having described a preferred form of my invention, I claim:—

1. In an internal combustion engine, means for maintaining at the intake port, at the time of opening of said intake port, a scavenging air charge under a pressure which varies substantially as the resistance to the flow varies at varying engine speeds, means to cause an excess of such air over and above the quantity required to fill the cylinder to flow through the cylinder during the period in which the cylinder exhaust is open; and means to introduce to the cylinder a charge of carbureted air under a pressure which varies substantially as the resistance to flow varies at varying engine speeds.

2. In an internal combustion engine, means for maintaining at the intake port, at the time of opening of said intake port, a scavenging air charge under a pressure which varies substantially as the resistance to the flow varies at varying engine speeds, means to cause an excess of such air over and above the quantity required to fill the whole cylinder to flow through the cylinder during the period in which the cylinder exhaust is open; and means to introduce a charge of carbureted air to the cylinder.

3. In combination with an internal combustion engine, having intake and exhaust ports and valves controlling the same, air pressure raising means operated by the engine and adapted to compress air substantially to a pressure which varies as the resistance to flow of such air through the intake port varies at varying engine speeds; a passage leading from such means to the intake port, a carbureter also communicating with said intake port; and a passage connecting said carbureter with said first mentioned air passage, whereby the carbureter acts under the pressure raised by said means; said pressure raising means being of sufficient capacity to introduce to the engine cylinder a quantity of air in excess of the amount required to fill the cylinder, so that such excess flows out through the exhaust during the period that both exhaust and intake are open.

In witness that I claim the foregoing I have hereunto subscribed my name this 15th day of August, 1921.

JOHN M. CAGE.